United States Patent Office 2,951,067
Patented Aug. 30, 1960

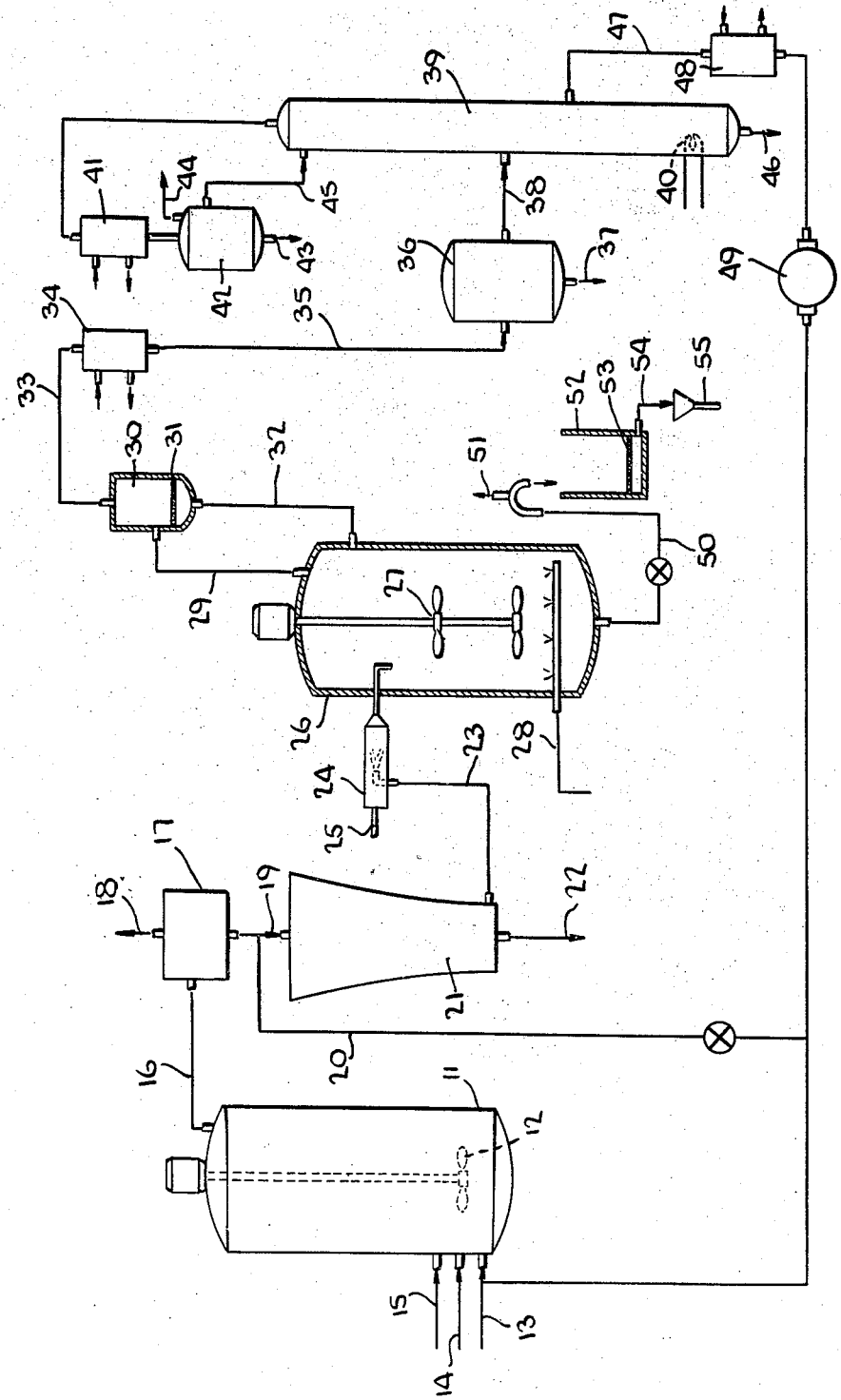

2,951,067

SOLVENT RECOVERY

Burton E. Cash, Pasadena, Tex., assignor to Celanese Corporation of America, New York, N.Y., a corporation of Delaware Filed Nov. 20, 1957, Ser. No. 697,653

20 Claims. (Cl. 260—94.9)

The present invention relates to a novel process for the polymerization of olefins. More particularly, it relates to a process for the polymerization of olefins in a solvent having catalyst slurried therein and for the subsequent treatment of waste catalyst to recover and recycle the solvent associated therewith.

In accordance with the present invention, solvent, a solid catalyst and at least one olefin monomer are continuously added to a reactor containing a slurry of catalyst in solvent, and a portion of the reactor contents is continuously withdrawn for recovery of the polymer formed. The solvent is one in which the polymer formed is soluble so that the product removed from the reactor comprises a dilute slurry of catalyst solids in solvent having monomer and polymer dissolved therein. The unconverted monomer is flashed off and the residue is treated to separate the major portion of the solvent from the solids slurried therein, this being effected by filtration, centrifugation, settling, or the like. The waste solids stream so separated is associated with a large amount of solvent and is treated for recovery of the solvent which is then recycled for re-use in the process.

To this end, the waste solids stream is discharged into a moving body of water to precipitate the polymer dissolved in the solvent portion of the waste stream and the mixture of water, waste catalyst, polymer and associated liquid solvent is heated to distill off the solvent, possibly with some water, and to leave a substantially solvent-free slurry of waste catalyst and polymer in water. The distillate is condensed and if it contains water is stratified, the solvent layer being separated for reuse at any desired stage of the process. The slurry of waste catalyst and polymer in water may be treated to isolate and regenerate the catalyst and to recover the polymer, or it can be discarded.

The composition of the catalyst will depend upon the nature of the monomer or monomers being reacted and upon the nature of the polymers desired to be produced. In the polymerization of an olefin such as ethylene, for example, the catalyst may comprise a Ziegler-type catalyst such as mixtures of aluminum alkyls and titanium or zirconium halides. Preferably, however the catalyst comprises those materials disclosed in Belgian Patent 530,617, such as metal oxides on a support, e.g. chromium oxide on silica, alumina, mixtures thereof and the like. The amount of chromium oxide in the catalyst may range from 0.1 to 10 to more weight percent of the support. The preferred support is a silica-alumina composite containing a predominant portion of silica and a minor portion of alumina by weight, e.g. 90–10 silica-alumina. The catalyst, prior to being fed to the reactor, is usually activated with air at a temperature in the range of 750 to 1500° F. for a period of 3 to 10 hours or more. The particle size of the catalyst preferably ranges between about 0.1 and 150 microns although smaller particles as well as larger particles can be used.

Monomers which can be polymerized in accordance with the invention include olefins such as ethylene, propylene, 1-and 2-butene, 1- and 2-pentene, 1-and 2-hexene, 1-and 2-octene, 1-dodecene, isobutylene, 2-methyl-1-butene, 3-methyl 1-butene, 4-methyl-1-pentene, 4-vinylcyclohexene, 2-methyl-2-butene, cyclohexene, butadiene, isoprene, mixtures thereof, and the like. Of these, the preferred monomers are those which give higher molecular weight solid polymers, i.e. 1-olefins of maximum monomer chain length of about 8 carbon atoms and no branching nearer the double bond than the 4-position. Diolefins also produce solid polymers if they have a terminal double bond. In the case of conjugated diolefins, a substituent such as a methyl, chloro or ethyl group can be closer than the 4-position, e.g. as close as the 3-position to the terminal double bond.

The solvent employed to slurry the catalyst and in which the polymerization is preferably effected is an inert hydrocarbon solvent such as propane, butane, isobutane, n-pentane, isopentane, isooctane, hexane, cyclohexane, methylcyclohexane, decalin, tetralin, benzene, toluene, xylene, mixtures thereof, and the like. Of these, cyclohexane is particularly useful.

The temperature of polymerization normally ranges from about 150 to 450° F. with 240 to 325° F. being preferred for ethylene and 150 to 250° F. being preferred for propylene and higher 1-olefins.

The pressure in the reactor must be high enough to maintain the solvent in the liquid phase and to assure that monomers not liquefied under the prevailing conditions dissolve in the liquid phase in sufficient amount. This generally requires a pressure of at least 100 to 300 p.s.i.g.

The reaction product is freed of monomer by flashing and the flasher residue is treated to separate a substantially catalyst-free liquid phase and a waste solids stream comprising catalyst associated with solution.

The temperature of the waste solids stream at this point ranges from about 140 to 320° F. and it is under a pressure of from about 75 to 95 p.s.i.g. in order to keep the solvent in liquid state. Where the waste solids stream is the residue of an ethylene polymerization its temperature at this point generally ranges from about 230 to 320° F. and preferably 275 to 300° F. The exact composition of the waste solids stream will depend upon the conditions of reaction, the degree of dilution and the manner in which the solids stream was separated from the liquid stream, i.e. filtration or centrifugation. This stream may contain about 1 to 5%, preferably about 1 to 3%, by weight, of catalyst and about 1 to 4.5% by weight of polyethylene.

The solids stream of waste catalyst and associated solution is preferably discharged by spraying into water moving through a pipe in the direction of flow of the water, the polymer precipitating in a discrete particle form. The water temperature ranges from about 70 to 100° F. and preferably 85 to 95° F. It is supplied in an amount ranging from about 1 to 6 times and preferably 2 to 3 times the volume of the waste solids stream. The rate of flow of water is such that the temperature in the pipe immediately beyond the spray section ranges from about 100 to 135° F., and preferably 120 to 130° F. The configuration of the pipe and the pressure of the feed water are such that the pressure in the pipe immediately adjacent the spray section is at least 60 to 100 p.s.i.g. This pressure ensures that the solvent, which enters the section under high temperature, will not at any time be volatilized.

The materials leaving the pipe are then subjected to distillation to boil off the solvent, which when cyclohexane is employed will come off as an azeotrope with water. The distillate can be dried in any manner and can be re-used in the earlier stages of the process.

The invention will now be described more fully with reference to the accompanying drawing showing a flow sheet illustrating one embodiment of the present invention.

In the drawing, there is shown a reactor 11 provided with an agitator 12 and fed with solvent through a line 13, fed with a solid catalyst conveniently slurried in some solvent through a line 14 and fed with olefin monomer through a line 15. A slurry, comprising catalyst in solvent having monomer and polymer dissolved therein, is continuously withdrawn through a line 16 and passed to a flasher 17 where unreacted monomer is flashed off through a vent 18 to be recovered for re-use. The slurried residue from the flasher passes off through a line 19, is preferably diluted with additional solvent admitted through a line 20, and enters a continuous centrifuge 21. The bulk of the solvent with polymer dissolved therein is taken off through line 22 for recovery of the polymer.

The solids stream separated by the centrifuge 21, comprising waste catalyst with an appreciable amount of adherent solution, leaves through a conduit 23 and discharges as a hollow cone spray in longitudinal direction of a mixing T 24. Warm water is admitted to the mixing T 24 through conduit 25. Polymer dissolved in the solvent admitted to T 24 through conduit 23 is precipitated in particulate form, and the slurry of solid polymer and solid waste catalyst in water and liquid organic solvent is discharged into a solvent stripper 26 containing a body of water (not shown) which is stirred vigorously by agitator 27. Steam is passed through a pipe 28 into stripper 26 below the water level and a mixture of vapors of water and organic solvent passes off through line 29 through a knockout drum 30 to retain on screen 31 any entrained solids and to return to the stripper 26 by means of return pipe 32 any liquids entrained in the vapor mixture. The vapor mixture continues through a pipe 33 and undergoes heat exchange with cool water in a condenser 34. The condensed liquid mixture passes through a pipe 35 to a phase separator 36 in which stratification takes place, water being withdrawn through line 37 and wet solvent being withdrawn through line 38. The solvent so withdrawn is passed to a rectifier 39 heated at 40 and the distilled vapors of water, solvent and a small amount of non-condensibles are cooled in condenser 41 and stratified in decanter 42. Water at the bottom of the decanter 42 is drawn off through line 43 and discarded. Non-condensibles are vented at 44. The solvent upper layer is refluxed to rectifier 39 through line 45. A concentrated solution of solvent and high boiling impurities is withdrawn from the bottom of rectifier 39 at 46. Dry solvent is withdrawn from the rectifier 39 as a vapor sidestream, at 47, is liquefied in condenser 48, and pumped by pump 49 back to reactor 11 by way of line 13. This liquid may in part also be used as the diluting medium added through line 20.

Referring again to the stripper 26, the body of water having waste catalyst solids and polymer slurried therein, is drawn off through a pipe 50 provided with an overflow vent 51 into a drum 52. The solids in the water slurry are retained on a screen 53 and the water passes through an outlet 54 to a drain 55. When drum 52 is filled, it is replaced by an empty drum and dumped.

The flashing off of unreacted monomer, the centrifugal separation of clear solution and the rectification of separated solvent have each been shown as taking place in a single stage but any or all of these can be carried out in a plurality of stages if the particular equipment or operating conditions should make this desirable.

By way of comparison, if the initial waste stream is first contacted with water in the stripper 26 without use of T 24, the polymer dissolved in the solvent of the waste stream precipitates in a stringy form which adheres to the agitator and the walls of the vessel, requiring shutdown for cleaning after only a short time. The novel process, however, sprays the waste stream into a body of water under conditions such that the polymer precipitates as small discrete particles. By the time the polymer particles enter the water in the stripper they are sufficiently hardened so that they will not adhere to the wall or agitator. Thus, trouble-free extended operation is permitted.

The following example is given to illustrate the invention further.

*Example*

Using an apparatus such as that shown in the drawing, from the reactor operating at 290° F. and 420 p.s.i.g. to polymerize ethylene in a slurry in cyclohexane of chromium oxide on 90/10 by weight silica/alumina, analyzing 2.3% by weight of chromium, there is withdrawn a stream which is flashed to 285° F. and 60 p.s.i.g. The flasher residue comprises by weight 95% of cyclohexane, with the balance constituting catalyst and polymer. This residue is diluted with cyclohexane to bring the solids concentration down to 4.2% by weight and the thinned out slurry is centrifuged. The liquid stream, which is substantially free of catalyst, comprises a 4.1% by weight solution of polyethylene in cyclohexane and is treated for separation of polyethylene in any known manner; the solids stream comprises 2% by weight of catalyst and 3.9% by weight of polyethylene, in cyclohexane.

This waste solids stream at 290° F. and 155 p.s.i.g., is sprayed through a hollow cone spray nozzle at the end of a 1 inch nominal diameter pipe into a mixing T comprising a 1½ foot length of pipe 2 inches in nominal diameter. The volume rate of feed of water to the T is 3 times that of the polymer solution fed to the T. The water is fed to the T at a temperature of 90° F. and a pressure of 65 p.s.i.g. In the T just beyond the spray nozzle the temperature is 130° F. and the pressure is 60 p.s.i.g. The mixture of water, cyclohexane, precipitated polyethylene and waste catalyst is passed into the solvent stripper containing a water slurry at a temperature of 180° F. into which there is charged steam at a temperature of 228° F. and 5 p.s.i.g. The solvent vapors after passing through the knockout drum are condensed, the water layer is withdrawn and the cyclohexane layer is rectified. The anhydrous purified cyclohexane is recycled to the reactor as part of the cyclohexane feed.

It is to be understood that the foregoing detailed description is given merely by way of illustration and that many variations may be made therein without departing from the spirit of my invention.

Having described my invention, what I desire to secure by Letters Patent is:

1. The process for the polymerization of an olefin which comprises contacting an aliphatic olefin, a solid catalyst for polymerizing said olefin into a normally solid polymer and a solvent at a pressure sufficient to maintain said solvent in liquid state, thereby to form a slurry of said catalyst in said solvent having a polymer of said olefin dissolved therein, separating said slurry into a liquid stream substantially free from catalyst and comprising a solution of polymer in solvent and a solids stream comprising waste catalyst associated with said solution, discharging said solids stream into a moving body of water under conditions of temperature and pressure that maintain the solvent in liquid phase and precipitating the polymer dissolved in the associated solution to form a mixture of waste catalyst and polymer solids slurried in water and liquid solvent, and then distilling off the solvent from said mixture, said precipitation being effected prior to said distillation, said moving body of water being cooler than said solids stream, said precipitation being effected in a zone maintained under a pressure sufficient to prevent volatilization of said solvent, and said distillation being effected in another zone maintained under a lower pressure than the first-named zone.

2. The process set forth in claim 1, including the step of diluting said slurry with additional solvent to facilitate mixing of said solids stream with water.

3. The process set forth in claim 2, wherein distillation of solvent from said mixture is effected by heating said mixture with steam, thereby distilling off solvent and water, and including the further steps of condensing the distillate, stratifying the condensate into an aqueous layer and a solvent layer, rectifying the solvent layer, and recycling said solvent for re-use in the process.

4. The process for the polymerization of an olefin which comprises contacting an aliphatic olefin, a solid catalyst for polymerizing said olefin into a normally solid polymer and a hydrocarbon solvent at a temperature ranging from about 150 to 450° F. and a pressure sufficient to maintain said solvent in liquid state, thereby to form a slurry of said catalyst in said solvent having said olefin and its polymer dissolved therein, separating unconverted olefin from said slurry, separating said slurry into a liquid stream substantially free from catalyst and comprising a solution of polymer in solvent and a solids stream comprising waste catalyst associated with said solution, discharging said solids stream at a temperature ranging from about 140 to 320° F. into a moving body of water and precipitating in particulate form the polymer dissolved in the associated solution to form a mixture of waste catalyst and polymer solids slurried in water and liquid solvent, the temperature of said mixture as formed ranging from about 100 to 135° F. and the pressure being at least about 60 p.s.i.g., then distilling off the solvent from said mixture, and recycling the solvent for re-use in the process, said precipitation being effected prior to said distillation.

5. The process set forth in claim 4, wherein the temperature of the moving body of water prior to contact with the solids stream ranges from about 70 to 100° F.

6. The process set forth in claim 4, including the step of diluting said slurry with additional solvent to bring the concentration of polymer to below about 4.5% by weight in said solids stream.

7. The process set forth in claim 4, wherein from about 1 to 6 volumes of water are supplied to the zone into which said solids stream is discharged for each volume of said solids stream.

8. The process for the polymerization of ethylene which comprises contacting ethylene, a solid chromium oxide-containing catalyst and a hydrocarbon solvent at a temperature ranging from about 240 to 325° F. and a pressure sufficient to maintain said solvent in liquid state, thereby to form a slurry of said catalyst in said solvent having ethylene and polyethylene dissolved therein, reducing the pressure on said slurry to flash off unconverted ethylene, separating said slurry into a liquid stream substantially free from catalyst and comprising a solution of polyethylene in solvent and a solids stream comprising waste catalyst associated with said solution, spraying said solids stream at a temperature ranging from about 275 to 300° F. into a body of water moving through a zone under such conditions that the temperature in said zone ranges from about 120 to 130° F. and the pressure is at least about 60 p.s.i.g., thereby to precipitate in particulate form the polyethylene dissolved in the associated solution and to form a mixture of waste catalyst and polyethylene solids slurried in water and liquid solvent, then distilling off the solvent from said mixture, and recycling the solvent for re-use in the process said precipitation being effected prior to said distillation.

9. The process set forth in claim 8, wherein said catalyst comprises chromium oxide on a mixture of silica and alumina.

10. The process set forth in claim 8, wherein said solvent comprises cyclohexane.

11. The process set forth in claim 8, wherein from about 2 to 3 volumes of water are supplied to the zone into which said solids stream is sprayed for each volume of said solids stream.

12. The process for the recovery of solvent from a solids stream comprising waste catalyst associated with a solution of a normally solid polymer of an aliphatic olefin in a solvent, which comprises discharging said solids stream into a moving body of water under conditions of temperature and pressure that maintain the solvent in liquid phase and precipitating the polymer dissolved in the associated solution to form a mixture of waste catalyst and polymer solids slurried in water and liquid solvent, and then distilling off the solvent from said mixture, said precipitation being effected prior to said distillation, said moving body of water being cooler than said solids stream, said precipitation being effected in a zone maintained under a pressure sufficient to prevent volatilization of said solvent, and said distillation being effected in another zone maintained under a lower pressure than the first-named zone.

13. The process set forth in claim 12, wherein the concentration of polymer is below about 4.5% by weight in the solids stream which is discharged into water.

14. The process set forth in claim 12, wherein distillation of solvent from said mixture is effected by heating said mixture with steam, thereby distilling off solvent and water, and including the further steps of condensing the distillate, stratifying the condensate into an aqueous layer and a solvent layer, and rectifying the solvent layer.

15. The process for the recovery of solvent from a solids stream comprising waste catalyst associated with a solution of a normally solid polymer of an aliphatic olefin in a hydrocarbon solvent, which comprises discharging said solids stream at a temperature ranging from about 140 to 320° F. into a moving body of water under conditions of temperature and pressure that maintain the solvent in liquid phase and precipitating in particulate form the polymer dissolved in the associated solution to form a mixture of waste catalyst and polymer solids slurried in water and liquid solvent, the temperature of said mixture as formed ranging from about 100 to 135° F. and the pressure being at least about 60 p.s.i.g., and then distilling off the solvent from said mixture, said precipitation being effected prior to said distillation.

16. The process set forth in claim 15, wherein the temperature of the moving body of water prior to contact with the solids stream ranges from about 70 to 100° F.

17. The process for the recovery of solvent from a solids stream comprising a waste chromium oxide-containing catalyst associated with a solution of polyethylene in a hydrocarbon solvent, which comprises spraying said solids stream at a temperature ranging from about 275 to 300° F. into a body of water moving through a zone under such conditions that the temperature in said zone ranges from about 120 to 130° F. and the pressure is at least about 60 p.s.i.g., thereby to precipitate in particulate form the polyethylene dissolved in the associated solution and to form a mixture of waste catalyst and polyethylene solids slurried in water and solvent, and then distilling off the solvent from said mixture, said precipitation being effected prior to said distillation.

18. The process set forth in claim 17, wherein said catalyst comprises chromium oxide on a mixture of silica and alumina.

19. The process set forth in claim 17, wherein said solvent comprises cyclohexane.

20. The process set forth in claim 17, wherein from about 1 to 6 volumes of water are supplied to the zone into which said solids stream is sprayed for each volume of said solids stream.

References Cited in the file of this patent

UNITED STATES PATENTS

| | | | |
|---|---|---|---|
| 2,384,967 | Schumacher et al. | Sept. 18, 1945 |
| 2,537,130 | Green | Jan. 9, 1951 |
| 2,607,763 | Hipkin et al. | Aug. 19, 1952 |
| 2,691,647 | Field et al. | Oct. 12, 1954 |
| 2,702,288 | Hoeksema et al. | Feb. 15, 1955 |
| 2,766,224 | Bannon | Oct. 9, 1956 |
| 2,858,902 | Cottle | Nov. 4, 1958 |